(12) United States Patent
Spitler et al.

(10) Patent No.: US 11,689,563 B1
(45) Date of Patent: Jun. 27, 2023

(54) DISCRETE AND AGGREGATE EMAIL ANALYSIS TO INFER USER BEHAVIOR

(71) Applicant: Nudge Security, Inc., Las Vegas, NV (US)

(72) Inventors: Russell Spitler, Jackson, WY (US); Jaime Blasco, Austin, TX (US)

(73) Assignee: Nudge Security, Inc., Las Vegas, NV (US)

( * ) Notice: Subject to any disclaimer, the term of this patent is extended or adjusted under 35 U.S.C. 154(b) by 0 days.

(21) Appl. No.: 18/048,735

(22) Filed: Oct. 21, 2022

Related U.S. Application Data

(60) Provisional application No. 63/270,717, filed on Oct. 22, 2021.

(51) Int. Cl.
*H04L 9/40* (2022.01)

(52) U.S. Cl.
CPC .................................. *H04L 63/145* (2013.01)

(58) Field of Classification Search
CPC ............... H04L 51/212; H04L 63/1416; H04L 63/1425; H04L 63/145; H04L 63/1408; H04L 63/0236; H04L 63/14; H04L 67/535; H04L 63/1466; G06F 21/554; G06F 21/56; G06F 21/564
See application file for complete search history.

(56) References Cited

U.S. PATENT DOCUMENTS

| | | |
|---|---|---|
| 8,935,190 B2 | 1/2015 | Amoroso et al. |
| 10,089,581 B2 | 10/2018 | Flores |
| 10,291,638 B1 * | 5/2019 | Chandana ........... H04L 63/1441 |
| 10,397,272 B1 | 8/2019 | Bruss |
| 10,740,563 B2 | 8/2020 | Dugan |
| 10,936,733 B2 | 3/2021 | Gonzalez |
| 11,372,870 B2 | 6/2022 | Weber |

(Continued)

OTHER PUBLICATIONS

Iqbal et al., "Email classification analysis using machine learning techniques," Department of Computer Science, COMSATS University Islamabad, Attock Campus, Attock, Pakistan; Accepted Apr. 17, 2022, 13 pages.

(Continued)

*Primary Examiner* — Ali S Abyaneh
(74) *Attorney, Agent, or Firm* — Kowert, Hood, Munyon, Rankin & Goetzel, P.C.; Dean M. Munyon; Gentry C. McLean

(57) ABSTRACT

Techniques for detecting emails that pertain to Internet services are disclosed. Information about such emails can be recognized by performing a discrete analysis of the email before delivering the email to the user and determining whether a corrective action is warranted. Such emails can be recognized by heuristic pattern analysis that scans incoming emails for patterns known to pertain to certain Internet services. Emails relating to other Internet services can be detected by a machine learning classifier that uses labeled training data. These accesses to Internet services can be written to a database. In many implementations, such discrete analysis is performed after an email has been classified as legitimate by one or both of a spam filter and a malware detector. An aggregate analysis, whose output can also update the database, can provide a broad picture of Internet service usage within a set of email users (e.g., by department).

30 Claims, 12 Drawing Sheets

(56) References Cited

U.S. PATENT DOCUMENTS

| | | | |
|---|---|---|---|
| 2007/0214220 A1 | 9/2007 | Alsop | |
| 2008/0276179 A1 | 11/2008 | Borenstein et al. | |
| 2009/0070866 A1* | 3/2009 | Erikson | H04L 63/126 |
| | | | 726/14 |
| 2009/0319629 A1* | 12/2009 | de Guerre | G06Q 10/107 |
| | | | 726/1 |
| 2009/0327849 A1 | 12/2009 | Kavanagh | |
| 2010/0265845 A1* | 10/2010 | Lampen | H04W 12/088 |
| | | | 370/254 |
| 2012/0330971 A1 | 12/2012 | Thomas | |
| 2013/0024520 A1 | 1/2013 | Siminoff | |
| 2015/0113079 A1 | 4/2015 | Etgar et al. | |
| 2015/0172251 A1* | 6/2015 | Tico | H04L 51/23 |
| | | | 709/206 |
| 2015/0235166 A1 | 8/2015 | Brady | |
| 2016/0315833 A1* | 10/2016 | Simpson | G06Q 30/0232 |
| 2018/0374053 A1 | 12/2018 | Willamowski | |
| 2019/0075168 A1* | 3/2019 | Goldfarb | H04L 63/0272 |
| 2020/0342337 A1 | 10/2020 | Choudhary | |
| 2020/0356525 A1 | 11/2020 | Ahn et al. | |
| 2021/0144174 A1* | 5/2021 | N | H04L 63/1433 |
| 2021/0374679 A1* | 12/2021 | Bratman | G06Q 10/107 |
| 2021/0390510 A1* | 12/2021 | Wuslich | H04L 63/1441 |
| 2022/0182347 A1* | 6/2022 | Khosla | H04L 63/0227 |
| 2022/0222703 A1 | 7/2022 | Lagi | |
| 2022/0394047 A1* | 12/2022 | Lee | H04L 51/08 |

OTHER PUBLICATIONS

Potale et al., "Email Correlation and Analysis Using Pattern Matching Technique," International Journal of Emerging Technology and Computer Science, ISSN: 2455-9954, vol. 3 Issue 2 Apr. 2018, pp. 131-133.

Martin et al. "Analyzing Behaviorial Features for Email Classification," published in Interational Conference on Email and Anti-Spam, 2005, 8 pages.

Ssebulime, ""Email Classification Using Machine Learning Techniques,"" ResearchGate, Research Proposal—Jan. 2022, 5 pages.

* cited by examiner

402

Request for information – Twilio

You are using Twilio, an app that employees in our company do not commonly use. Help us understand why you chose to create an account for Twilio by responding to this message:

[ I am starting a new project ]  [ I am experimenting ]

404

Enable two-factor authentication in Twilio

You just started using Twilio. Help protect our organization by enabling two-factor authentication for nudge security. Here's how:

[ I already have ]  [ Help me! ]

Sentry

Confirm email

Thanks for signing up for Sentry!

Please confirm you email (taccount@sheepdoglabs.ie) by clicking below.
This link will expire in 48 hours.

[ Confirm ]

Notification settings                                    Home

414

Sentry does not meet required standards for a security service

You just attempted to register for a service which does not meet the corporate policy for your organization. Sentry does not have the required security certifications for a security service.

[ Request exception ]

Amazon web services <no-reply-aws@amazon.com>
To me

Greetings from amazon web services,

This email confirms that your latest billing statement, for account ending in *****, is avaliable on the AWS web site. Your account Total: $18.22

432

◯ slack

Send this signup link to your teammates

You've enabled anyone with @email.io or @email.com email address to join the email workspace on slack.

The next step is to chare the link to your workspace's signup page:

https://join.com/signup

Be sure to mention that it's necessary to use an @email.io or @email.com email address for signing up.

To add or remove approved email domains, visit your workspace settings.

Account creation timeline
The history of accounts created by Owen Auth

470B

Account creation timeline
The history of accounts created by Albert Tross

Query: Collaboration services

| SaaS service | Enterprise account | Adoption percentage |
|---|---|---|
| Zoom | True | 100 |
| Webex | False | 2 |

```
┌─────────────────────────────────┐
│ Identifying, by a computer system, a first │
│ set of emails indicative of accesses by a user │
│ of an email system to a known set of │
│ Internet services, wherein the first set of │
│ emails is identified using a set of rules │
│ 610 │
└─────────────────────────────────┘
              │
              ▼
┌─────────────────────────────────┐
│ Identifying, by the computer system, a │
│ second set of emails indicative of accesses │
│ by the user to Internet services not within │
│ the known set, wherein the second set of │
│ emails is identified using a machine learning │
│ classifier │
│ 620 │
└─────────────────────────────────┘
              │
              ▼
┌─────────────────────────────────┐
│ Determining, by the computer system based │
│ on the first and second sets of emails, │
│ Internet service information identifying an │
│ aggregate set of Internet services accessed │
│ by the user │
│ 630 │
└─────────────────────────────────┘
              │
              ▼
┌─────────────────────────────────┐
│ Storing, by the computer system, the │
│ Internet service information in a database │
│ 640 │
└─────────────────────────────────┘
```

```
┌─────────────────────────────────────┐
│ Accessing, by a computer system, an │
│ email addressed to a user of an     │
│ email system                        │
│ 710                                 │
└─────────────────────────────────────┘
                  │
                  ▼
┌─────────────────────────────────────┐
│ Performing a discrete analysis of   │
│ the email                           │
│ 720                                 │
└─────────────────────────────────────┘
                  │
                  ▼
┌─────────────────────────────────────┐
│ Using content of the email to update│
│ a database that stores indications  │
│ of Internet service activity of     │
│ users of the email system in        │
│ response to the discrete analysis   │
│ indicating that the email pertains  │
│ to an internet service being used   │
│ by the user                         │
│ 730                                 │
└─────────────────────────────────────┘
                  │
                  ▼
┌─────────────────────────────────────┐
│ Determining, based on the discrete  │
│ analysis, whether a corrective      │
│ action for the email is to be taken │
│ 740                                 │
└─────────────────────────────────────┘
                  │
                  ▼
┌─────────────────────────────────────┐
│ Performing an aggregate analysis of │
│ Internet service activity of        │
│ multiple users of the email system, │
│ wherein the aggregate analysis      │
│ takes into account the Internet     │
│ service activity indicated by the   │
│ discrete analysis of the email      │
│ 750                                 │
└─────────────────────────────────────┘
                  │
                  ▼
┌─────────────────────────────────────┐
│ Updating the database based on the  │
│ aggregate analysis                  │
│ 760                                 │
└─────────────────────────────────────┘
```

FIG. 7

DISCRETE AND AGGREGATE EMAIL ANALYSIS TO INFER USER BEHAVIOR

CROSS-REFERENCE TO RELATED APPLICATIONS

The present application claims priority to U.S. Provisional Application No. 63/270,717, entitled "Analysis of User Email to Detect Established Internet Services," filed Oct. 22, 2021, the disclosure of which is incorporated by reference herein in its entirety.

The present application is also related to U.S. application Ser. No. 18/048,723, entitled "Analysis of User Email to Detect Use of Internet Services," which is being filed concurrently with the present application, and which is incorporated by reference herein in its entirety.

BACKGROUND

Technical Field

This application relates generally to email analysis, and more particularly to the use of such analysis to provide visibility into properties of Internet services that are in use within an enterprise.

Description of the Related Art

Many of the most popular services available on the Internet (GMAIL, TWITTER, FACEBOOK, to name a few) are built on the premise of users trading services for their personally identifiable information (PII), which can then be used to direct advertising to those users. One result of this model is an incentive for every website or service to collect and store information about their users to increase the economic value of their customer base. As a result, individuals navigating the Internet are constantly asked to create accounts and supply personal information for various services. This paradigm has desensitized users to the constant requests for information, resulting in a sprawl of information and accounts across the Internet.

BRIEF DESCRIPTION OF THE DRAWINGS

FIG. 4A depicts example of an employee information request and an employee action request generated by a policy engine.

FIG. 4B depicts an example email and a subsequent quarantine message for that email.

FIG. 4D illustrates examples of system recording metadata about user Internet accounts.

FIG. 4G depicts an example of detection of anomalous service usage within an organization based on aggregate account analysis.

FIG. 6 is a flow diagram of one embodiment of a method for detecting Internet services being used within an organization.

FIG. 7 is a flow diagram of one embodiment of a method for using discrete and aggregate email analysis to make inferences about behavior of users of an email system.

DETAILED DESCRIPTION

Figure 1:
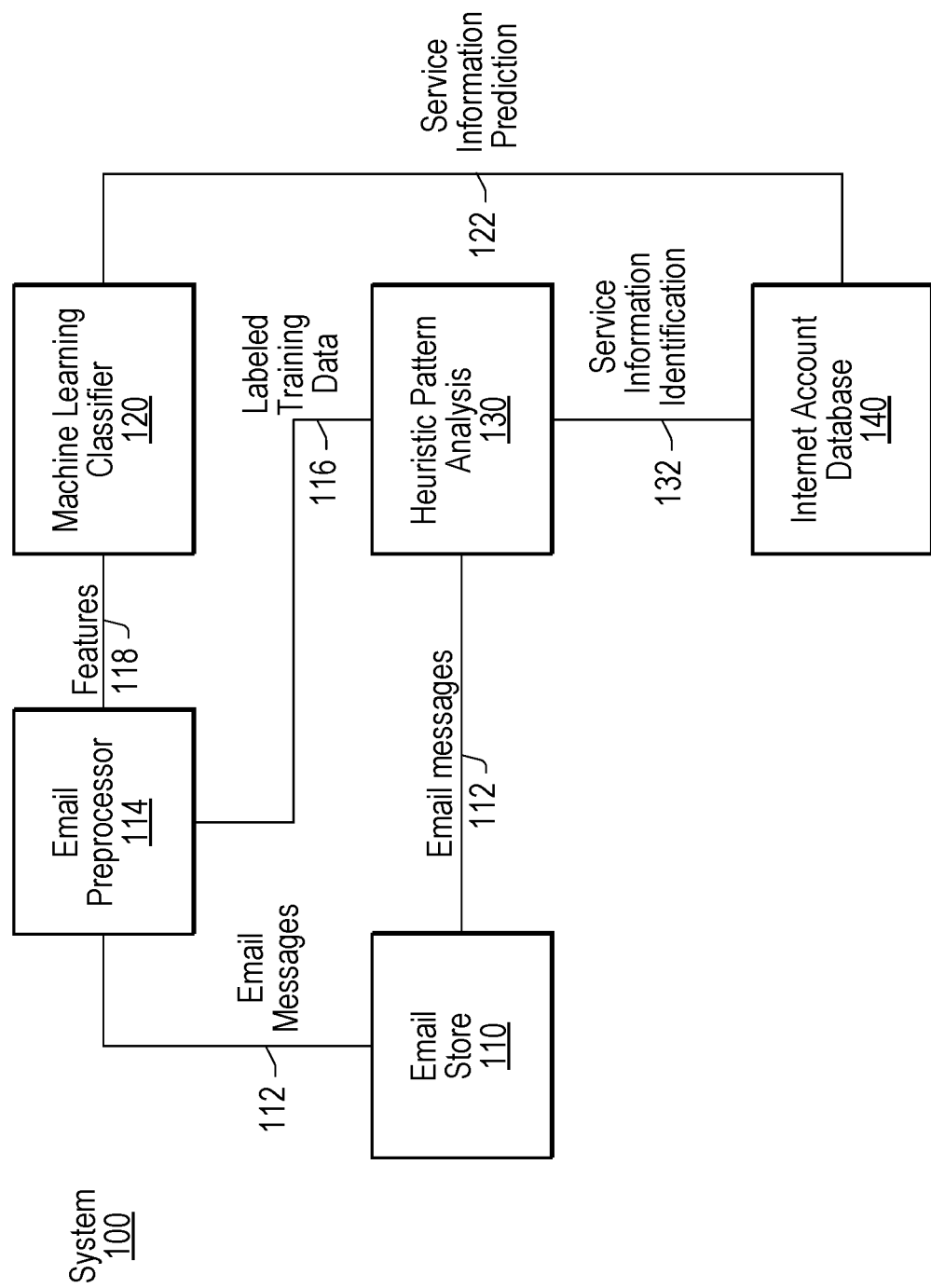
FIG. 1 is a block diagram of a system for discovery of Internet accounts for users of an email system.

The proliferation of Internet account creation, which began in users' personal lives, has transitioned into the professional realm. It is routine today for employees to register for services using their professional identities (e.g., work email and address, corporate credit cards, etc.). The result of this trend is that employees are now trading something that in many cases they do not own—information that belongs to their employer—for various Internet services. As used herein, "Internet services" refers broadly to any service accessed over the Internet for which a user has an account, which is typically tied to an email address of the user. Thus, an Internet service may be a social media service, a file sharing service, a streaming service, etc.

In most cases, corporations have little, if any, visibility into what users are doing with their corporate identities (e.g., an email address within a network domain of a corporation). This has several implications. There may be reputational issues—for example, employees posting objectionable content on social media. Similarly, unauthorized use of Internet services (for example, a securities trader posting about trades on social media during business hours) may lead to compliance issues. Even more troubling are the security risks that result from this information sprawl. The availability of personal and corporate user information on the dark web has allowed criminal groups to patch together complete identities and use those profiles to perpetrate fraud. For example, when attempting to open a bank account the criminal may overcome security challenges using the record patched from a number of breaches—a Social Security Number from one and the last address from another breach. These composite records create a profile which can allow criminals to overcome most security challenges based on private information. Thus, there are a variety of ways a user might violate a usage policy of an entity such as a corporation through creation and use of Internet services.

Individuals and organizations today seeking to combat this conflation of personal and professional identities face an initial problem of identifying, for a particular user, an accurate list of Internet accounts created by the particular user over the years, as well as the type of PII each account stores. The challenge is that individuals, whether in their personal or professional contexts, generally do not rigorously catalog every website they visited or account they have created over the course of many years of Internet usage.

Theoretically, some services such as password managers or the "save my password" features in popular browsers could aid in creating this inventory. In practice, however, the comprehensiveness of results from such techniques is spotty at best, as it is based on the consistency of their use by the individual in question. A complete browsing history or an archive of network activity of particular users would also be useful in the creation of such an account catalog, but this is impractical, particularly since this browsing history is commonly spread across multiple user devices (e.g., various computers, phones, tablets), often over a long time period. Accordingly, there is not a single, consistent place to pull together this information for analysis. This leaves individuals with their memories, and incomplete information in browsers and password managers, as the best current approach to creating an enumeration of the services they have used and shared information with over the years.

The inventor has recognized that email is almost always used in the process of account creation and registration for Internet services. That is, generally speaking, most services that provide an account require an email address, which is used as a communication channel between the service provider and the user. This channel can be used not only to establish the account, but also to provide updates on account activity. For example, email can be used for critical security events such as password updates or login attempts, and it can also be used for notifications on activity within the account such as use of important features. The inventor has recognized that the consistency of the use of email provides a convenient, and in many cases, relatively comprehensive, source of data for identifying the various accounts associated with an individual, as well as the nature of data within those accounts and various actions that have been performed via these accounts.

The present disclosure proposes solving the problem of determining the use of Internet accounts for a user by employing email analysis of the user's email accounts (existing emails and/or incoming emails) using a combination of heuristic pattern analysis and machine learning in order to create a record of these accounts. The emails identified by the analysis may be referred to broadly as "account activity emails." The record may include a variety of information, for example: events indicating the creation of accounts created and dates, events indicating the nature and type of information shared with the service providers, events indicating ongoing use of the service and frequency of use, events indicating use of security features of the service, events that resulted in the publishing of a public statement on behalf of the user, events indicating the cost of the service and ongoing costs associated with use, and events indicating activity related to the service such as sharing a file publicly or the creation of a new source code repository.

This record of a user's Internet footprint allows both users and their employers the ability to reduce that footprint as well as use the cataloged information to prevent abuse or a security breach.

A high-level block diagram of one embodiment for implementing such email analysis is shown in FIG. 1. As shown, system 100 includes email store 110, email preprocessor 114, machine learning classifier 120, heuristic pattern analysis module 130, and an Internet account database 140 for storing results of the analysis. In various embodiments, these components may be implemented on a single computer system or multiple computer systems, either on a local- or wide-area network.

The email analysis begins with the email store 110 of a particular user. Email store 110 may constitute one or more email accounts of the particular user—for example, the particular user's corporate email account. This analysis may be conducted on whatever portion of the user's email is available—the greater amount of email is available, the better the results will be. Any format of email store 110 that allows textual analysis of individual emails and their metadata is suitable.

The email analysis conducted by system 100 takes two forms: rule-based (heuristic) analysis, and machine learning-based analysis. The analysis of system 100 is based on the recognition that accounts for many common Internet services (e.g., GMAIL, FACEBOOK, TWITTER) may be recognized by searching for known textual patterns in emails, while less common Internet services (or, more precisely, those services not identified by the rules-based approach) can be recognized using machine learning classification techniques. The former category can be positively identified using a known set of rules-based heuristics, while the latter category can be predicted based on a trained machine learning model.

The use of heuristic pattern analysis module 130 may be quite effective for the identification of common services and frequent events. The nature of the email communication for account-related events is typically automated. That is, emails relating to these events are not custom communications written by an employee of the service provider, but rather are emails based on templates nominally individualized and sent by an automated system. This reality provides for an excellent basis for analysis by a rules-based engine. The rules in this engine provide common search patterns for the selection of data for analysis and define analytical patterns for the identification of relevant events. Furthermore, these rules can then define data extraction patterns for the identification and isolation of data points contained within the email to further enrich the identified events. This approach is quite effective for commonly used services providers and common events associated with them. A search pattern can be provided to extract the relevant communications from a well-known service provider, then the resulting data set can be analyzed for event identification and data extraction specific to the known communication templates of that service provider. As the templates used to communicate the existence of these events are relatively static, this approach can provide efficient results.

Take for example the following excerpt from an email from the cloud-service provider AWS:

You now have access to the AWS Management Console for the account ending in 1517.

Sign-in URL: https://newaccount.signin.aws.amazon.com/console

From this excerpt we can identity and extract two meaningful pieces of data-the last four digits of the account number (1517) and the account identifier ("newaccount"). Using a rules-based engine we can create a template as follows:

You now have access to the AWS Management Console for the account ending in <ACCOUNT NUMBER>.

Sign-in URL: http://<ACCOUNT IDENTIFIER>.signin.aws.amazon.com

This template can then be applied to other emails from AWS to extract similar data.

As another example, it can be determined that INSTAGRAM always sends updates via the following e-mail addresses: security@mail.instagram.com and no-reply@mail.instagram.com. You can identify relevant e-mails by searching for e-mails sent from those accounts for further processing. Once you get a list of e-mails you can find specific events by defining rules to look at the subject or body content. For example, if the subject line contains "Verify Your Account," the e-mail may be classified as email_confirmation. If the subject line contains "Password reset on Instagram" or "Reset Your Password" then the e-mail is classified as a 'password reset' event. If the subject line contains "Your Instagram password has been changed," then the e-mail is classified as 'password reset confirmation' event. If the subject line contains "Two-factor authentication is on", then the e-mail is classified as a 'two factor enabled' event. Various other types of similar classifications may be made. In addition, a set of regular expressions can be created to extract entities from those e-mails. For example, the INSTAGRAM username may be extracted using regular expressions such as 'Hi (?P<username>[^,!\.\s]+),!' or 'www.instagram.com\/(?P<username>[^\\s]+)'.

Service information identification data 132 that is determined by heuristic pattern analysis module 130 may be written to Internet account database 140. Database 140 is simply a repository or data store in which a catalog or summary of the user or users corresponding to email store 110 is maintained. As noted, this catalog may indicate a set of accounts belonging to the user or users, as well as the type of information stored in these accounts and an indication of user activity.

While identification of account information by a rules-based engine can be performed efficiently for common services it is difficult to practically implement for less common services given the substantial number of service providers in existence. For this reason, machine learning techniques act as a strong complement to the heuristic approach that is used for the common providers. Leveraging a supervised learning algorithm, the data set from the heuristic analysis augmented with a manually labeled dataset can be used to train a machine learning model for identification of the events of interest—without having a priori knowledge about the service provider that created the events.

Natural language processing (NLP) techniques is a subcategory of artificial intelligence (AI) in which machines analyze natural languages to extract meaningful information. Text classification is one type of NLP, and can be used to automatically classify email messages into predefined categories (e.g., account creation, password reset, etc.) without foreknowledge of the format of the email messages. There are particular algorithms that are well-suited to text classification, including Naïve Bayes, support vector machines (SVM), and deep learning. Naïve Bayes and SVM have the advantage that small training data sets can still produce accurate results. Machine learning classifier 120 may thus implement various types of these text classification algorithms.

Classifier 120 may be trained using labeled training data 116 from heuristic pattern analysis module 130. This data is considered "labeled" because its classification is known from the various heuristics performed in module 130. Accordingly, labeled training data may include verified account creation emails, password reset emails, etc. Labeled training data 116 may be supplied to email preprocessor module 114, which as described below with reference to FIG. 2, creates features 118 that can be input to classifier 120. In some implementations, classifier 120 may be implemented on a server, and thus be able to receive labeled training data 116 from different instances of module 130 running on different email stores on different clients. In this manner, classifier 120 will benefit from the greatest possible amount of labeled training data 116.

Once trained, machine learning classifier 120 can operate on features 118 corresponding to email messages 112 that are not categorized by heuristic pattern analysis module 130. Classifier 120 outputs service classifications of email messages 112, called "service information predictions 122," since these classifications are considered to be predictions of Internet services for a user, as opposed to the service information identifications 132, which are considered to be known Internet services since they are based on known email formats for Internet services. Both types of service information (122 and 132) are stored in Internet account database 140.

The combination of a machine learning algorithm and a heuristic analysis engine provides an efficient solution for the explicit identification of the events required for the catalog of services in use by an individual user or a group of users (e.g., a set of users within a particular organization). With this catalog it is possible for the individual to understand the scope of their digital footprint and work to reduce and lockdown that scope to reduce the chance the data will be used in the perpetuation of fraud against them.

Figure 2:
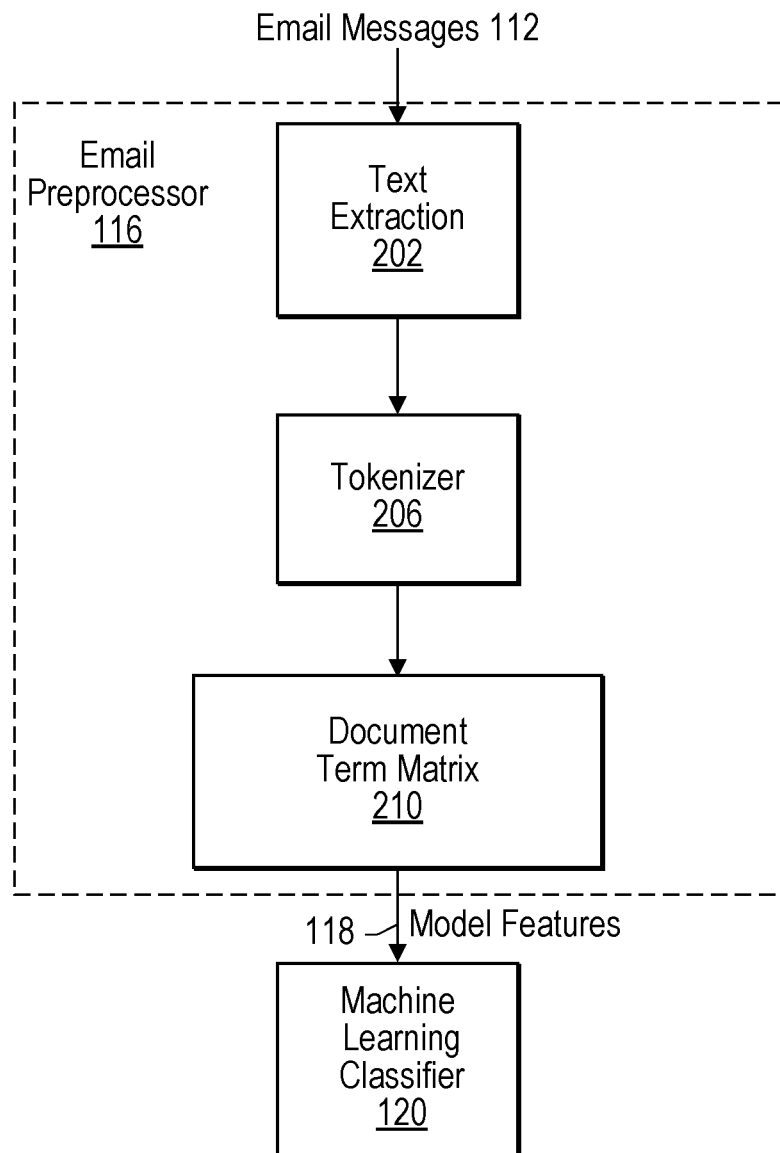
FIG. 2 is a block diagram illustrating possible natural language processing (NLP) actions that may be performed within an email preprocessor module.

Possible natural language processing (NLP) actions that may be performed within email preprocessor module 116 are shown in FIG. 2.

As shown, in 202, text is extracted from an email message 112. This may be obtained either from the e-mail message itself, or from an HTML version. Next, in 206, a tokenizer is used. Tokenization can divide a message into pieces (tokens) and perhaps also throw away certain characters such as punctuation and certain terms. For example, given the text "The cat sat on the mat.", corresponding tokens may be "The", "cat", "sat", "on", "the", "mat", ".".

Next, a mathematical matrix that describes the frequency of terms that appear in a document corpus or a collection of documents. This may generally be referred to as Document Term Matrix (DTM). Two possible ways to implement this are by a count vectorizer or a term frequency-inverse document frequency (TF-IDF) processor.

TF-IDF is a numerical statistic that is intended to reflect how important a word is to a document in a collection or corpus. It is often used as a weighting factor in user modeling. The TF-IDF value increases proportionally to the number of times a word appears in a document and is offset by the number of documents in the corpus that contain the word, which helps to adjust for the fact that some words appear more frequently in general. In one implementation of TD-IDF, we first need to define Term Frequency TF(t, d) as the number of occurrences of token t in document d divided by the number of words in document d. Inverse Document Frequency (IDF) may then be defined as IDF (t, d)=log N/Dft, where N is the total number of documents in the training set and DFt is the number of documents that also contain the token t. Finally, the Term Frequency—Inverse Document Frequency (TFIDF) is defined as: TFID (t, d, D)=TF(t, d)*TDF(w, d).

The term-weighted outputs produced by the implementation of DTM 210 constitute model features 118, which are supplied to machine learning classifier 120.

Another model that may be used is a Transformer model—for example, a pre-trained BERT auto-encoding Transformer model that has been trained as a language model. The training for this model is done on a large amount of text data using self-supervised learning to predict the next word. Using transfer learning, this model may be fine-tuned using supervised learning. This approach has better accuracy when classifying, but it requires more resources in terms of memory and CPU/GPU in order to make predictions.

The techniques described above are usable to discover a set of Internet services of a single user. For individual users, a catalog of Internet services may allow the user to regain a measure of control over their online presence. For example, a set of Internet services discovered for a particular user might be an input to a privacy application that permits the user to request, through the application, that various accounts be shut down, downgraded, or PII updated or removed. Such an application might also permit a user to make requests under any controlling regulations to restrict how services use their PII. Still further, this type of application might cross-reference a set of Internet services discovered for a particular user with various databases showing how services are using this information. For example, a privacy application for a user might list that user's Internet accounts along with a score or other indicia of how those services are managing/using the user's data. Still further, the application might include controls for each service that allow the user to perform "one-stop" maintenance for their online profile by requesting changes in how PII is managed by the various services.

These same techniques are also usable to discover an aggregate set of Internet services for a group of users. This aggregate set of Internet services might correspond to members of an organization, employees of a corporation, etc.

On the corporate side, Internet-service discovery on a company-wide scale might be quite enlightening to IT professionals and business decision makers. Currently, there is not a feasible mechanism for determining the set of Internet services used by employees of a company. Using the techniques of this disclosure, a company can more accurately determine what services are being used by employees. This information can be stored, for example, in a database. In one implementation, services might be categorized as "company-sanctioned," "acceptable," "discouraged," and "forbidden." (Other categorizations are possible.) "Acceptable" services might be those services that, while not officially sanctioned by a company IT department, are nevertheless needed for certain company employees.

Once the universe of services for an organization is known, the aggregate set of services may be provided to a security product or a suite of security products for further processing. Accordingly, risk scores/profiles may be developed for each discovered service. From there, risk profiles (security profiles) for individual users may be generated based on a given user's set of services and the risk scores for those services. This information may then be used to determine a least privileged set of permissions for individual users. This determination might entail determining which services are endorsed, tolerated, and prohibited in a corporate setting.

Figure 3:
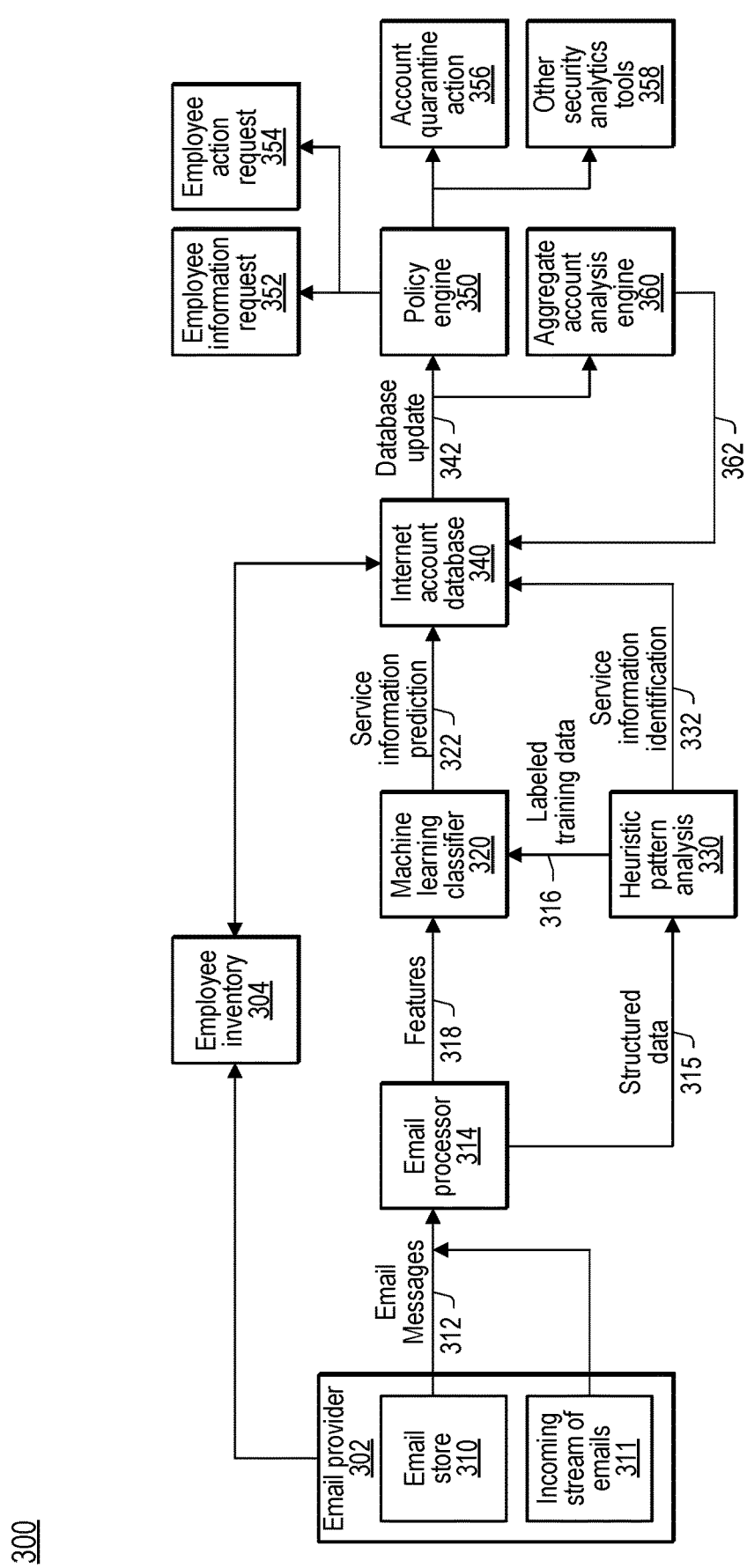
FIG. 3 is a block diagram of a system for initial discovery of Internet accounts for users of an email system, as well as providing ongoing discovery, implementing an email policy, and performing aggregate analysis.

FIG. 3 illustrates how the paradigm of FIG. 1 can be extended to not only create a baseline Internet account database, but also to maintain this database for ongoing operations of an entity. As depicted, computer system 300 includes numerous elements previously described with respect to FIG. 1. This system also includes additional elements that leverage stored information relating to Internet accounts created or accessed using entity resources.

As shown, system 300 analyzes entity emails from email provider 302. (Although one email provider for an entity is common, the disclosed system can be extended to multiple email providers if needed.) The resources of email provider 302 include email store 310 and incoming stream 311, which are collectively referred to as email messages 312. Email store 310 refers to an extant set of emails, which may be analyzed as discussed in the context of FIG. 1 to create Internet account database 340. After a baseline for database 340 is established, it may be updated based on an analysis of additional emails in stream 311.

As described above with respect to FIG. 1, a heuristic pattern analysis module (indicated in FIG. 3 by reference numeral 330) and a machine learning classifier (reference numeral 320) operate to classify emails from email stream 311 and update Internet account database 340 accordingly.

More specifically, module 330 is executable to recognize emails in stream 311 that fit predetermined patterns for Internet account activity emails and log such emails to database 340 with service information identification data 332. Similarly, module 320 is executable to predict, based on labeled training data 316 created by module 330, emails as being Internet account activity emails even if such emails do not fit patterns recognized by module 330. Module 320 updates database 340 with service information prediction data 322.

Note that FIG. 3 shows a slightly different architecture from FIG. 1. In FIG. 3, email messages 312 are sent to email preprocessor 314, where they can be sent to heuristic pattern analysis module 330 as structured data 315 and to machine learning classifier 320 as selected features 318. Module 330 also sends labeled training data 316 to machine learning classifier 320 to aid in training. Data 316 can be labeled to indicate whether particular emails correspond to Internet account accesses or not.

Employee inventory 304 represents additional employee data that is available for writing data to database 340. Inventory 304 includes data about employees that have accounts with email provider 302. Data in inventory 304 may include information such as employees' roles in a company, geographic location, relationship to other employees (e.g., as indicated by an org chart), tenure with the company, etc. In this manner, the information written to database 340 can provide a more complete picture of activity within an entity. For example, access to information in inventory 304 can allow access to Internet services to be grouped by corporate department, location, etc.

When an Internet account access email is detected by module 330 or predicted by module 320 and database 340 is updated, an indication of a database update 342 is sent to modules 350 and 360. Policy engine 350 can employ a set of rules to determine whether any action needs to be taken before allowing a particular email to be delivered to the addressee. Aggregated account analysis engine 360 determines whether additional updates 362 to database 340 are warranted in view of the current email being analyzed.

One action that engine 350 can initiate is an employee information request 352. For example, request 352 might send a message to the addressee of the email that asks information about why the user is using the Internet service indicated by the email. Note that this action would not stop the email from being delivered in one implementation.

Another action that engine 350 can initiate is an employee action request 354. In contrast to request 352, request 354 requires an employee to take some action before the email in question will be delivered. An example of request 354 is for the user to take additional security steps with respect to the request. Thus, the user might need to set up two-factor authentication with the provider that implements system 300 before the email is delivered.

Other emails might be so sensitive that they are immediately quarantined, as in account quarantine action 356, which is provided. Certain Internet services might be deemed to be inherently unsafe (e.g., due to known security flaws) or to serve no legitimate business purpose (e.g., pornography). Such services can be identified by engine 350 and quarantined. Reports of quarantined emails can be provided to IT administrators for the company.

As noted, individual emails, in addition to processing by system 300, may also be of interest to another security product or suite of security products. Such emails may be routed accordingly, as indicated by action 358.

The actions taken by policy engine 350 each apply to individual emails. But system 300 also seeks to determine the Internet usage of the broader organization. This analysis is undertaken by aggregate account analysis engine 360. While policy engine 350 will determine what if any further action needs to be taken with respect to the email itself, engine 360 can determine if additional updates 362 need to be made to database 340. In response to a new email, engine 360 might perform an analysis for all users in the same department as the current email addressee. Such analysis might reveal, for example, that the current email pertains to a service that is used by most or all members of the same department. This analysis can be used to present reports to IT administrators regarding the nature of services actually being used by company employees.

FIGS. 4A-G illustrate various examples of how system 300 can be used in a corporate IT setting.

FIG. 4A depicts messages 402 and 404. Message 402 is an example of employee information request 452. Message 402 is produced in response to a particular user receiving an email indicative of an access to the Internet service TWILIO. Message 402 is sent in order to gain more information about why the particular user is utilizing this service. The user's response to message 402 can be recorded in database 340. Note that in some implementations, message 402 is sent in addition to delivering the email in question. In contrast, message 404 is an example of employee action request 454. Message 404 can request that a user take some action (here, enabling two-factor authentication) before the email will actually be delivered. Any number of employee information requests or actions can be enacted by policy engine 350.

FIG. 4B depicts email 412 and corresponding quarantine message 414. System 300 can prevent employees from registering for certain Internet services by intercepting the registration emails. Email 412 is an account confirmation email for the service sentry.com. As is standard practice, it is necessary to confirm this email using the link in the email to begin using the newly created account. In this example, sentry.com has been determined to not meet corporate policy. Accordingly, system 300 sends a replacement email 414 detailing the policy violation.

By intercepting the registration email the system prevents the user from confirming the account and finishing the account creation process. The replacement email can helpfully contain a summary of why the new account was disallowed by corporate policy and instructions for requesting exception to the policy. This provides organizations with a universal mechanism to disallow the use of services that do not adhere to policy, while providing the user with a path to create the account after going through an exception process.

Figure 4C:
FIG. 4C provides an example of transforming an email into an event having a structure that makes it able to be consumed by other security tools.

FIG. 4C illustrates that policy engine 350 can cause relevant emails to be transformed into an event, such that corresponding data can be consumed by other security tools. Such an approach can provide universal detection of account take-over events for all employees and accounts in the organization. As described, system 300 analyzes emails for notifications of activity within a user account that is security-relevant. System 300 can identify events such as password resets, contact information updates, disabling of two-factor authentication, and addition of other authentication methods. These emails can be transformed into structured data for consumption by security analytics tools.

Consider example email 420 from bitrise.io, indicating that two-factor authentication has been disabled. This email, which may be indicative of an account take-over, can be transformed into an event with the following structure:

```
{
  "user" :"owen.authora@nudgesecurity.com",
  "event": "two-factor-disabled",
  "Time": "Oct 5, 2021, 4:36 AM UTC"
}
```

This structure can be selected to comply with any suitable security data format, such that it can easily be consumed by a security analytics tool to provide insight into potential account take-over activity or another security incident.

FIG. 4D illustrates examples of system 300 recording metadata about user Internet accounts. Thus, system 300 can record not only that a given user has established a particular account, but also attributes of those accounts. For example, system 300 can determine that a user has administrative responsibility for a particular account. This can be performed, for example, by heuristic pattern analysis module 330 identifying emails related to user management or account level notifications such as billing. Once identified, system 300 can record the role of the user for that service in database 340, providing further insight into the administrative responsibilities for that service.

FIG. 4D includes two sample emails indicative of administrative responsibilities. Upon receipt of email 430 from AWS, which includes billing information, system 300 is able to identify that the recipient is an administrator for the account included in the email. Similarly, upon receipt of email 432 from SLACK, which includes language that the recipient can enable others to join a SLACK workspace, system 300 is able to identify that the recipient is an administrator for the account included in the email.

Figure 4E:
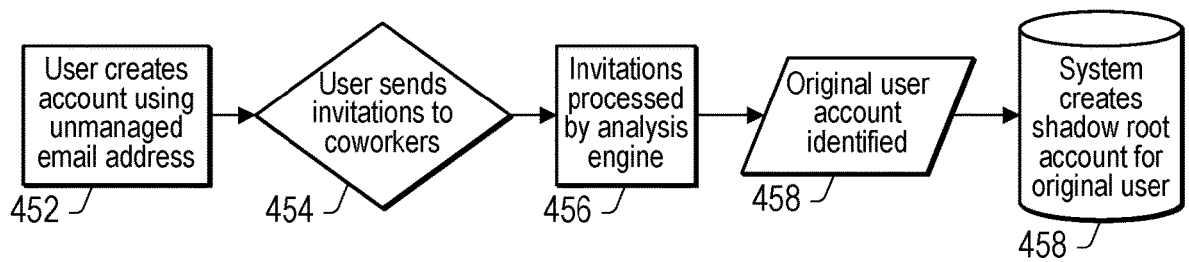
FIG. 4E provides an example of analyzing email content in order to identify non-organization-managed email address used to access Internet services.
Figure 4E:

FIG. 4E provides an example of heuristics that can leverage information in employee database 304. When system 300 analyzes emails sent to an organization-managed email address, there is a potential source of false-negatives when a user registers for an account with an alternate email address (e.g., an unmanaged email account such as a personal email address). A common capability of certain Internet services is providing the facility to invite additional users to collaborate within the service. The system can leverage such "invites" to identify the existence of an account created with an alternate email address to provide visibility into the original account.

Consider flow 450 in FIG. 4E. At 452, organization employee Albert Tross creates an account for an Internet service using an unmanaged email address (e.g., albert.tross@example.com). At 454, Albert sends invitations to the service to coworkers—for example to user1@entity.org and user2@entity.org (both managed email addresses). Email 462 in FIG. 4E is an example of such an email that may be sent by the SLACK service. At 456, system 300 will process these invitation emails. Specifically, heuristic pattern analysis module 330 can recognize the format of an invitation email, and the attempt to identify the source of the invite to determine whether it is from an account known to the system. After attempting to match on managed email addresses (e.g., albert.tross@entity.org), module 330 may attempt to map the email address found in email 462 with members of the organization listed in employee inventory 304. Thus, module 330 can match employee Albert Tross from inventory 304 with the user id in unmanaged email address albert.tross@example.com at458. Then, at 460, system 300 can create a "shadow root" account for employee Albert Tross in database 340. Subsequent SLACK email invitations from albert.tross@example.com will thus be matched to the established shadow root account, which is now associated with managed email address albert.tross@entity.org. System 300 can thus analyze email content in order to identify non-organization-managed email addresses used to access Internet services.

Figure 4F:
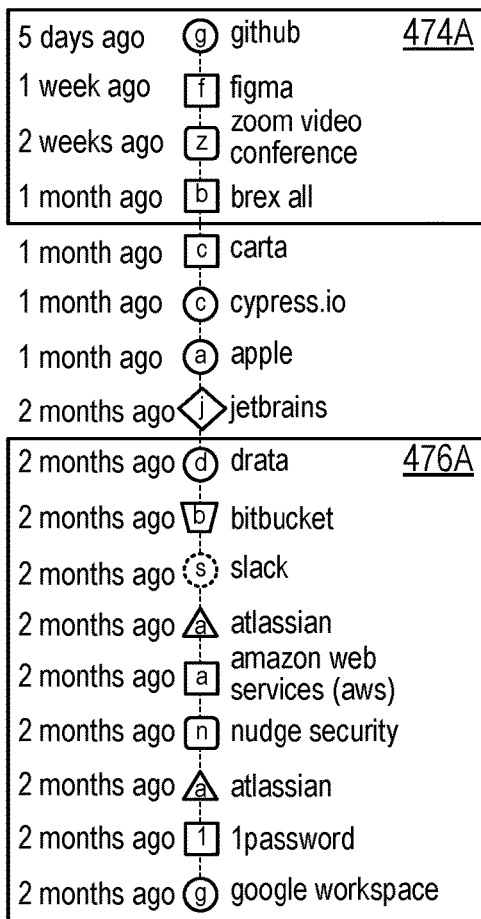
FIG. 4F depicts an example of detecting a standard set of Internet services that are provisioned for a particular set of users.
Figure 4F:

FIG. 4F illustrates the use of system 300 to analyze information from multiple accounts. Organizations often centrally provision accounts required for new employees. This set of accounts, however, is often only a subset of the total required accounts to perform their job function. The gap between the total set of accounts and the centrally provisioned accounts is often due to incomplete knowledge by the central team. System 300 can be used to identify accounts that are provisioned by centralized teams by analyzing the history of account creation for each employee, then identifies common accounts provisioned after this initial phase.

Using knowledge of the organizational structure and employee start dates (which can be provided by employee inventory 304), system 300 can analyze the provisioning of accounts across members of the same organizational unit. Using clustering techniques known within data science, system 300 can identify the initial set of accounts provisioned to any member of the team. System 300 can then identify common accounts provisioned for a team by analyzing subsequent creation of accounts past the initial provisioning period. These functions can be performed, for example, by aggregate account analysis engine 360.

Timelines 470A and 470B in FIG. 4F show the initial provisioning of accounts for two members of a development organization. Accounts 476 in the box at the bottom of each timeline represent the initial set of centrally provisioned accounts, and accounts 474 in the box at the top of each timeline represent additional accounts required for the team member to perform their job that were provisioned after the fact. System 300 can make this information available to IT administrators for an entity, which can inform the company as to services that may need to be provisioned centrally. System 300 can thus determine, for a particular set of users (e.g., a particular department), a total set of standard Internet services that are provisioned.

FIG. 4G illustrates another example of information that can be obtained by analyzing multiple accounts (e.g., using aggregate account analysis engine 360). Organizations frequently adopt a standard service for a common function within the organization (e.g., video conferencing). Nevertheless, some employees, due either to ignorance of the standard or personal preference, create accounts for an alternative service. System 300 can analyze usage of Internet services across an organization to identify corporate standards for a category of service—for example, DROPBOX for file sharing or ZOOM for video conferencing. Information on individual employee usage can be stored in data base 340. Engine 360 can then analyze multiple employees' usage, particularly for specific departments as denoted by information from employee inventory 304. This data can then be used to identify, within a company as a whole or a particular portion of the company, employees' anomalous usage of Internet services that deviate from a proposed standard.

Report 480 illustrates that for a particular organization, 100% of the employees are using ZOOM for the corporate video conferencing solution. The prevalence of this service can be used as a de facto indicator that ZOOM is the corporate standard. WEBEX, by contrast in this example, can be seen to be the nonstandard solution. IT administrators can thus use system 300 in order to determine what services are using as well as what services can be said to constitute a standard.

Figure 5:
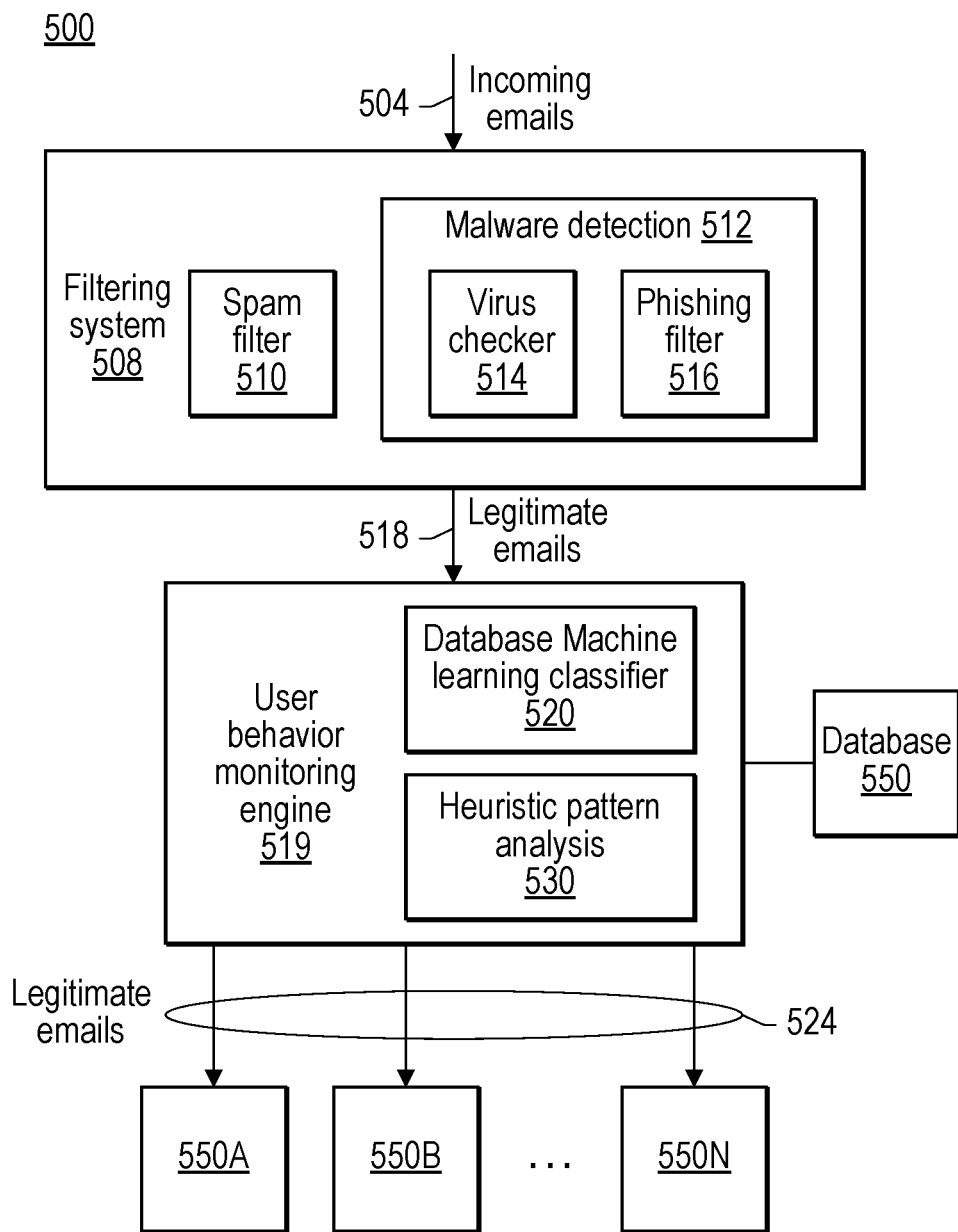
FIG. 5 is a block diagram of a user behavior monitoring engine within an email system.

The techniques described above can thus be used to discern user behavior of users in an email system-for example, determining the Internet services with which users are interacting. This approach works particularly well when operating on emails that are deemed to be legitimate emails. This paradigm is shown in FIG. 5, which is a block diagram of one embodiment of an email system.

As depicted, email system 500 shows a stream of incoming emails 504 that are handled by a filtering system 508. Filtering system 508 is representative of any number of filters that may be applied to an incoming email stream in order to prevent non-legitimate emails from being delivered to inboxes 550 of users of email system 500. Broadly speaking, these non-legitimate emails include spam emails, which are caught by spam filter 510 and malware, which are caught by malware detection module 512. "Spam" refers to emails that, while not necessarily malicious in nature, are unsolicited. Left unchecked, spam email can clog user inboxes and cause legitimate emails to be missed. "Malware" is a broad term and can include virus, phishing attacks, and the like. Virus checker module 514 and phishing filter 516 are representative of the types of filters that may be applied by malware detection module 512. Other types of content filters may be applied, such as those that analyze attachments to emails. Some emails, such as those that include pornography, could be categorized as both spam and malware.

Note that in many cases, an organization's email system may be hosted on a server remote from the organization itself (e.g., in a cloud computing environment). As such, some or all of filtering system 508 may be implemented remotely as well, often by third-party providers. Note that a filtering system need not necessarily have both spam and malware filtering in a given implementation.

The output of filtering system 508 is thus legitimate emails 518. Of course, no filtering system is one hundred percent accurate. Legitimate emails 518 thus refers to emails deemed legitimate by email system 500. Emails 518 will invariably contain some amount of spam and/or malware, although the percentage will be quite small for state-of-the-art spam and malware detection.

The techniques described in this disclosure are intended to analyze user emails to make inferences about the behavior of those users. For example, the present disclosure has shown how a machine learning classifier (e.g., machine learning classifier 120) and a heuristic pattern analysis module (e.g., heuristic pattern analysis module 130) can be used to make inferences about the Internet services that users of an email system are using. Because the broad intent is to determine user behavior, it is particularly advantageous for the techniques of the present disclosure to be deployed on legitimate emails 518—that is, emails that have been deemed legitimate by an email filtering system such as system 508. The rationale here is that inferences as to user behavior are in many cases best detected by excluding emails not solicited by users of the system.

As shown, user behavior monitoring engine 519 can thus be interposed between filtering system 508 and user inboxes 550. Engine 519 can thus include components such as machine learning classifier 520 and heuristic pattern analysis module 530, which can operate as shown for example in FIG. 3 to update database 540. Engine 519 can thus be used to enforce an organization's Internet usage policy. Such a policy might be used to curtail the use of certain Internet services, even if those services are not malicious in nature. In many cases, engine 519 might be used to simply gather information about user behavior—for example, by providing an IT department information about Internet services that are in use by employees of the corporation.

FIG. 6 is a flow diagram of a method 600 performed by a computer system identifying Internet service information. In some embodiments, method 600 includes more or less steps than shown. For example, an embodiment of method 600 may include storing Internet service information for multiple users in the database.

Method 600 commences in 610, in which the computer system (e.g., computer system 100) identifies a first set of emails indicative of accesses by a user of an email system to a known set of Internet services, wherein the first set of emails is identified using a set of rules. Various techniques may be used to apply the set of rules to identify the first set of emails. In some embodiments, identifying the first set of emails is performed by a heuristic pattern analysis module (e.g., heuristic pattern analysis module 130) that uses the set of rules. The rules may be based on known formats of account access emails within the known set of Internet services. References to a "known" set of Internet services means that those services are known to an entity developing the set of rules. For example, because it is a popular service, DROPBOX may be an example of a known Internet service. Because it is known, example emails from DROPBOX may be used to formulate the set of rules.

Method 600 continues in 620, in which the computer system identifies additional emails that were not identified using the set of rules. The computer system identifies a second set of emails indicative of accesses by the user to Internet services not within the known set, where the second set of emails is identified using a machine learning classifier (e.g., machine learning classifier 120). In many cases, it is advantageous to use information from previously identified emails (e.g., from known Internet services) to train the machine learning classifier, as previously identified emails may share features with other unidentified emails indicating accesses to Internet service. Thus, in some embodiments, the machine learning classifier has been trained based on a labeled data set (e.g., labeled training data 316) produced by the heuristic pattern analysis module.

In some embodiments, the emails analyzed to determine the first and second sets of emails include emails previously delivered to an inbox of the user. Additionally or alternatively, the emails analyzed to determine the first and second sets of emails may be addressed to a user's inbox but not yet delivered. In some cases, the email may have been previously classified by a filtering system (e.g., spam filters, malware detection filters) as legitimate emails before the user receives them.

Method 600 continues at 630, in which the computer system determines, based on the first and second sets of emails, Internet service information identifying an aggregate set of Internet services accessed by the user. This aggregate set can thus include Internet services identified as part of the first set of emails, the second set of emails, or both.

The Internet service information may be used to provide more insights into user account creation. For example, it may be useful to know what information users are sharing to an Internet service. Accordingly, Internet service information may include an indication of the types of information shared by the user with Internet services in the aggregate set of Internet services. The organization may want to ensure that a specific approved service is being used for a given task (e.g., videoconferencing), and therefore may have Internet service information include an indication of frequency of use by the user of Internet services within the aggregate set of Internet services. Organizations may also want to ensure that its internal information is not made public and may thus have Internet service information include an indication of information that has been made publicly available as a result of the user's accesses to Internet services. Additionally, organizations may want to ensure that no unauthorized software purchases are made using organization funds. Accordingly, Internet service information may include an indication of costs associated with use of the aggregate set of Internet services by the user.

In 640, the computer system stores the Internet service information in a database (e.g., Internet account database 140). The information stored in the database may be used to generate further analyses regarding one or multiple users. In some embodiments, the computer system generates, from the database, a report indicative of aggregate Internet service usage by users of the email system. This report may include use of services by users according to an Internet service usage policy. In other embodiments, the database is used to determine risk profiles for both Internet services and individual users of the email system, as services with determined risk profiles may be linked to specific users.

Other security measures may be taken using the computer system's stored identification data. The computer system may enhance the security of the organization by identifying security-relevant events using Internet service information and accordingly providing the security relevant events to a suite of security products for analysis.

While method 600 specifically discusses the identification of accesses by users to Internet services, other types of behavior may be identified by analyzing emails. Organizations that process a high volume of standardized forms may especially benefit from heuristic pattern analysis. Emails containing these standard forms can be identified and associated with the progress or completion of a particular process. For example, a government agency may identify specific government forms being emailed and extract metrics such as the performance of a given government employee in responding to and processing forms.

FIG. 6 describes a method performed by a computer system identifying Internet service information. FIG. 7, on the other hand, is a flow diagram of a method 700 whereby a computer system performs aggregate analysis on an email addressed to a user of an email system. For example, method 700 may be performed to compute the number of users of a given Internet service.

Method 700 commences in 710, in which the computer system accesses, by a computer system, an email addressed to a user of an email system. In 720, in which the computer system performs a discrete analysis of the email. The discrete analysis may be performed before the email is delivered to the user. In 730, the computer system uses content of the email to update a database that stores indications of Internet service activity of users of the email system in response to the discrete analysis indicating that the email pertains to an Internet service being used by the user. After the discrete analysis, method 700 continues in 740, in which the computer system determines, based on the discrete analysis, whether a corrective action for the email is to be taken. In some embodiments, the computer system performs the discrete analysis, updates the database, and determines whether a corrective action for the email is to be taken before the email is delivered to the user.

Method 700 continues in 750, in which the computer system performs an aggregate analysis of Internet service activity of multiple users of the email system, wherein the aggregate analysis takes into account the Internet service activity indicated by the discrete analysis of the email. In 760, the computer system updates the database based on the aggregate analysis.

Discrete analysis of an email is directed to analysis of a single email, while aggregate analysis refers to conducting an analysis that involves multiple emails (such as compiling statistics for behavior of individuals in a particular department).

The core economic model of the Internet is working against our long-term security. As users we have been conditioned to trade personal information for the use of services without consideration of the implications of the continued spread of our digital footprint. Faced with the growing consequences of an unmanaged digital footprint, this presents the challenge of trying to piece together our Internet usage history over many years and many devices. The use of email as a data source for the identification of a digital footprint provides a workable solution for most users. The combination of machine learning and heuristic analysis of that data set provides a comprehensive, reliable list of events which can be used to construct a catalog of Internet services in use, the data shared with those services, and important activities that have occurred. This catalog can be used by individuals and organizations to reduce their digital footprint, and lock down the services in use.

The various techniques described herein may be performed by one or more computer programs. The term "program" is to be construed broadly to cover any sequence of program instructions in a programming language that a computing device can execute or interpret. These programs may be written in any suitable computer language, including lower-level languages such as assembly and higher-level languages such as Python. An instance of a program being executed may be referred to as a "process." This disclosure also refers to "modules," which refers to a set of program instructions in any suitable form. In many cases, a module can refer to a subset of program instructions within a program that performs a particular function or set of functions.

Program instructions may be stored on a "non-transitory, computer-readable storage medium" or a "non-transitory, computer-readable medium." The storage of program instructions on such media permits execution of the program instructions by a computer system. These are broad terms intended to cover any type of computer memory or storage device that is capable of storing program instructions. The term "non-transitory," as is understood, refers to a tangible medium. Note that the program instructions may be stored on the medium in various formats (source code, compiled code, etc.).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

Note that in some cases, program instructions may be stored on a storage medium but not enabled to execute in a particular computing environment. For example, a particular computing environment (e.g., a first computer system) may have a parameter set that disables program instructions that are nonetheless resident on a storage medium of the first computer system. The recitation that these stored program instructions are "capable" of being executed is intended to account for and cover this possibility. Stated another way, program instructions stored on a computer-readable medium can be said to "executable" to perform certain functionality, whether or not current software configuration parameters permit such execution. Executability means that when and if the instructions are executed, they perform the functionality in question.

Similarly, a system that implements the methods described with respect to any of the disclosed techniques is also contemplated.

The present disclosure refers to various software operations that are performed in the context of a server computer system. In general, any of the services or functionalities described in this disclosure can be performed by a computer server that can be configured according to any known configuration of computer hardware. A typical hardware configuration includes a processor subsystem, memory, and one or more I/O devices coupled via an interconnect. A given computer server e may also be implemented as two or more computer systems operating together.

The processor subsystem of the computer server may include one or more processors or processing units. In some embodiments of the computer server, multiple instances of a processor subsystem may be coupled to the system interconnect. The processor subsystem (or each processor unit within a processor subsystem) may contain any of various processor features known in the art, such as a cache, hardware accelerator, etc.

The system memory of the computer server is usable to store program instructions executable by the processor subsystem to cause the computer server to perform various operations described herein. The system memory may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read-only memory (PROM, EEPROM, etc.), and so on. Memory in the computer server is not limited to primary storage. Rather, the computer server may also include other forms of storage such as cache memory in the processor subsystem and secondary storage in the I/O devices (e.g., a hard drive, storage array, etc.). In some embodiments, these other forms of storage may also store program instructions executable by the processor subsystem.

The interconnect of the computer server may connect the processor subsystem and memory with various I/O devices. One possible I/O interface is a bridge chip (e.g., Southbridge) from a front-side to one or more back-side buses. Examples of I/O devices include storage devices (hard drive, optical drive, removable flash drive, storage array, SAN, or their associated controller), network interface devices (e.g., to a computer network), or other devices (e.g., graphics, user interface devices.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure discusses potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:
   accessing, by a computer system, an email addressed to an email address of an email system, wherein the email address is for a user of the email system, and wherein the email has been categorized as a legitimate email after passing through one or both of a spam filter and a malware detector;
   performing, by the computer system, a discrete analysis of the email to determine behavior of the user, wherein the performing includes pattern matching based on a set of rules or classification by a machine learning model trained by a labeled data set;
   in response to the discrete analysis indicating that the behavior of the user pertains to use, by the user, of an Internet service established with the email address, using content of the email to update a database that stores indications of Internet service activity of users of the email system;
   determining, based on the discrete analysis, whether a corrective action for the email is to be taken;
   performing, by the computer system, an aggregate analysis of behavior of multiple users of the email system, wherein the aggregate analysis takes into account the determined behavior of the user indicated by the discrete analysis of the email; and
   updating the database based on the aggregate analysis.

2. The method of claim 1, wherein the accessed email has been cleared by both of a spam filter and a malware detector.

3. The method of claim 1, wherein the discrete analysis includes:
   using a set of rules to determine whether the email is indicative of an access to a known set of Internet services; and
   using a machine learning classifier to determine whether the email is indicative of an access to an Internet service not within the known set.

4. The method of claim 1, wherein the discrete analysis indicates that the behavior of the user pertains to a particular Internet service, and wherein the corrective action includes sending a message to the user that requires the user to conform to a security policy before the email is delivered.

5. The method of claim 1, wherein the discrete analysis indicates that the behavior of the user pertains to a particular Internet service, and wherein the computer system is configured to selectively perform one or more of the following corrective actions: requiring the user to supply additional information about use of the particular Internet service, requiring the user to comply with a security policy before delivering the email, quarantining the email in response to detecting a violation of the security policy, delivering the email to a security suite for analysis.

6. The method of claim 1, wherein the aggregate analysis uses data specifying properties of users within the email system.

7. The method of claim 1, wherein the discrete analysis determines that the user has administrative rights with respect to a particular Internet service to which the behavior of the user pertains.

8. The method of claim 1, wherein the email references a particular Internet service and a first email address that is external to the email system, and wherein the aggregate analysis includes:
identifying that the first email address belongs to a different user who also has a second email address within the email system; and
updating the database to associate the particular Internet service with the different user.

9. The method of claim 1, wherein the aggregate analysis determines, for a particular set of users, a total set of standard Internet services that are provisioned.

10. The method of claim 1, wherein the aggregate analysis identifies, for a particular set of users, a non-standard Internet service within a particular category of service.

11. A method, comprising:
accessing, by a computer system, an email addressed to a user of an email system, wherein the email has been categorized as a legitimate email after passing through one or both of a spam filter and a malware detector;
performing, by the computer system, a discrete analysis of the to determine behavior of the user, wherein the performing includes pattern matching based on a set of rules and classification by a machine learning model trained by a labeled data set produced by the pattern matching;
in response to the discrete analysis indicating that the behavior of the user pertains to use, by the user, of an Internet service, using content of the email to update a database that stores indications of Internet service activity of users of the email system;
determining, based on the discrete analysis, whether a corrective action for the email is to be taken;
performing, by the computer system, an aggregate analysis of behavior of multiple users of the email system, wherein the aggregate analysis takes into account the determined behavior of the user indicated by the discrete analysis of the email; and
updating the database based on the aggregate analysis.

12. The method of claim 11, wherein the discrete analysis and aggregate analysis are performed before the email is delivered to the user.

13. The method of claim 11, wherein the accessed email has been cleared by a spam filter and a malware detector.

14. The method of claim 11, wherein the discrete analysis includes:
using the set of rules to determine whether the email is indicative of an access to a known set of Internet services; and
using the machine learning model to determine whether the email is indicative of an access to an Internet service not within the known set.

15. The method of claim 11, wherein the aggregate analysis uses data specifying properties of users within the email system, the properties including roles of users within an organization.

16. The method of claim 11, wherein the email system is an email system used by an organization, and wherein performing the aggregate analysis includes identifying email addresses not managed by the organization that are being used to access Internet services.

17. The method of claim 11, wherein performing the aggregate analysis includes collecting information about a set of Internet services used within an organization.

18. The method of claim 11, wherein the corrective action includes sending the user an email message to comply with a security policy before delivering the email.

19. The method of claim 11, wherein the corrective action includes sending the email to a security suite for further analysis.

20. The method of claim 11, further comprising:
performing discrete analysis and aggregate analysis on a set of emails already delivered to the user and updating the database to reflect historical Internet service activity by the user.

21. A non-transitory, computer-readable storage medium storing program instructions executable by a computer system to perform operations comprising:
accessing, by a computer system, an email addressed to a user of an email system, wherein the email has already been classified by the email system as a legitimate email after passing through one or both of a spam filter and a malware detector;
performing, by the computer system, a discrete analysis of the email to determine behavior of the user, wherein the performing includes pattern matching based on a set of rules and classification by a machine learning model trained by a labeled data set produced by the pattern matching;
in response to the discrete analysis indicating that the behavior of the user pertains to use, by the user, of an Internet service, using content of the email to update a database that stores indications of Internet service activity of users of the email system;
determining, based on the discrete analysis, whether a corrective action for the email is to be taken; and
performing, an aggregate analysis of behavior of multiple users of the email system, wherein the aggregate analysis takes into account the determined behavior of the user as indicated by the discrete analysis of the email.

22. The computer-readable storage medium of claim 21, wherein the discrete analysis indicates that the behavior of the user pertains to a particular Internet service, and wherein the corrective action includes sending a message to the user that requires the user to conform to a security policy before the email is delivered.

23. The computer-readable storage medium of claim 21, wherein the aggregate analysis identifies, for a particular set of users of the email system, a non-standard Internet service within a particular category of service.

24. The computer-readable storage medium of claim 21, wherein the aggregate analysis uses data specifying properties of users within the email system, the properties including roles of users within an organization.

25. The computer-readable storage medium of claim 21, wherein the email references a particular Internet service and a first email address that is external to the email system, and wherein the aggregate analysis includes:
identifying that the first email address belongs to a different user who also has a second email address within the email system; and
updating the database to associate the particular Internet service with the different user.

26. The computer-readable storage medium of claim 21, wherein the operations further comprise:
performing discrete analysis and aggregate analysis on a set of emails already delivered to the user and updating the database to reflect historical Internet service activity by the user.

27. A non-transitory, computer-readable storage medium storing program instructions executable by a computer system to perform operations comprising:
accessing, by a computer system, an email addressed to a user of an email system, wherein the email has been categorized as a legitimate email after passing through one or both of a spam filter and a malware detector;

performing a discrete analysis of the email to determine behavior of the user, wherein the performing includes pattern matching based on a set of rules and classification by a machine learning model trained by a labeled data set produced by the pattern matching;

updating a database based on the discrete analysis;

performing an aggregate analysis of behavior of multiple users of the email system, wherein the aggregate analysis takes into account the determined behavior of the user as indicated by the discrete analysis of the email;

updating the database based on the aggregate analysis to indicate aggregate user behavior of the multiple users of the email system; and analyzing data in the database to output information indicative of behavior of users of the email system.

28. The computer-readable storage medium of claim 27, wherein the determined behavior relates to use of Internet services.

29. The computer-readable storage medium of claim 27, further comprising:

determining, based on the discrete analysis, whether a corrective action for the email is to be taken.

30. The computer-readable storage medium of claim 27, wherein the operations further comprise:

performing discrete analysis and aggregate analysis on a set of emails already delivered to the user and updating the database to reflect historical user behavior by the user.

* * * * *

UNITED STATES PATENT AND TRADEMARK OFFICE
CERTIFICATE OF CORRECTION

| | | |
|---|---|---|
| PATENT NO. | : 11,689,563 B1 | Page 1 of 1 |
| APPLICATION NO. | : 18/048735 | |
| DATED | : June 27, 2023 | |
| INVENTOR(S) | : Russell Spitler et al. | |

It is certified that error appears in the above-identified patent and that said Letters Patent is hereby corrected as shown below:

In the Claims

In Column 22 (Claim 21), Line 30, please delete "performing, an aggregate" and insert -- performing, by the computer system, an aggregate --.

Signed and Sealed this
First Day of August, 2023

*Katherine Kelly Vidal*

Katherine Kelly Vidal
*Director of the United States Patent and Trademark Office*